(12) United States Patent
Shyu et al.

(10) Patent No.: US 7,268,959 B2
(45) Date of Patent: Sep. 11, 2007

(54) LENS MODULE

(75) Inventors: San-Wuei Shyu, Taipei (TW); Chih-Hsiung Huang, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 253 days.

(21) Appl. No.: 11/195,753

(22) Filed: Aug. 3, 2005

(65) Prior Publication Data

US 2007/0030665 A1 Feb. 8, 2007

(51) Int. Cl.
*G02B 7/02* (2006.01)
(52) U.S. Cl. .................. 359/819; 359/822; 359/823
(58) Field of Classification Search .......... 359/819, 359/822, 823, 826, 829, 811, 813
See application file for complete search history.

(56) References Cited

U.S. PATENT DOCUMENTS

2007/0009246 A1* 1/2007 Lee .......................... 396/72

* cited by examiner

*Primary Examiner*—Timothy Thompson
(74) *Attorney, Agent, or Firm*—Lowe Hauptman Ham & Berner (57) ABSTRACT

A lens module includes a lens set, a rotation base, an outer case, elastic members, a driving device having a stepping motor and a base frame. The lens set is fixed inside the rotation base that is elastically arranged between an upper case and a lower case by elastic members. By clockwise/counterclockwise rotation of the stepping motor outside the rotation base, the rotation base is driven to rotate. Furthermore, a plurality of sloped grooved surface that goes from shallow to deep and faces downwards is disposed on circular bottom surface of the rotation base and each sloped grooved surface presses homogeneously on a corresponding supporting point of the power case by elastic members. When the rotation base rotates, the sloped grooved surface moves relative to the supporting point so that the gap between the shallow and deep grooved surfaces becomes focusing travel. Furthermore, the base frame assembles or disassembles with the lens module by a fastening mechanism. When being assembled, firstly the base frame is adhered to the printed circuit board and then the lens module is fastened on the base frame. If necessary, the lens module is dismounted from the base frame without any damage caused during the disassembling process.

4 Claims, 8 Drawing Sheets

LENS MODULE

BACKGROUND OF THE INVENTION

The present invention relates to a lens module applied on digital cameras or mobile phones, especially to a lens module whose focal length is driven and adjusted by a stepping motor. The lens module is locked on a frame first and then is fixed on a printed circuit board. The lens module can be separated from the printed circuit board by being disassembled with the frame.

Digital cameras or mobile phones with a shot function have a lens module with a focus-adjusting device. The lens modules available now are designed with features of light, think, compact, precision and durability. For example, the focus-adjusting device can be operating for at least thirty to fifty thousand times without loosing or falling off. Moreover, an image sensor such as CCD (charge coupled device) or CMOS (complementary metal-oxide semiconductor) is disposed on a printed circuit board located on read side (inner surface) of the lens. In usage, the conventional thread on type focus-adjusting device may have granules or powder due to friction between the male and female threads. Once the granules or powder falling on the CCD, the image quality is affected so as to have defective products. Moreover, when being assembled, the lens module is located on a printed circuit board. Generally, the lens module is headed on the CCD on the printed circuit board and then is attached (such as glued) on the printed circuit board after focusing with the CCD. However, once there is a stain on the CCD after gluing the lens module, the lens module needs to be disassembled with the printed circuit board. This lead to damage of the lens module and thus the lends module can't be used again. Thus the manufacturing cost is increased.

SUMMARY OF THE INVENTION

Therefore it is a primary object of the present invention to provide a lens module that is fixed inside a rotation base while the rotation base is arranged between an upper and a lower cases by an elastic member. By clockwise or counterclockwise rotation of a stepping motor outside the rotation base, the rotation base is driven to rotate within a certain range of angle. Moreover, a plurality of sloped grooved surface that goes from shallow to deep and faces downwards is disposed on circular bottom surface of the rotation base and each sloped grooved surface presses homogeneously on a corresponding supporting point of the power case by elastic member. Thus when the rotation base rotates clockwise/counterclockwise, the sloped grooved surface moves relative to the supporting point so that the gap between the shallow and deep grooved surfaces becomes focusing travel. Therefore, the rotation base has upward/downward displacement for focus adjustment.

It is another object of the present invention to provide a lens module that further having a base frame that assembles or disassembles with the lens module by a fastening mechanism. When the lens module is disposed on a printed circuit board, first the base frame is adhered to the printed circuit board and then the lens module is fastened on the base frame. If there is any stain on an image sensor such as CCD and it is necessary to disassemble the lens module, the lens module is easily disassembled with the base frame. Next the base frame is dismounted. Therefore, the lens module is disassembled without any damage caused during the disassembling process.

DETAILED DESCRIPTION OF THE PREFERRED EMBODIMENT

Refer from FIG. 1 to FIG. 5, a lens module 1 in accordance with the present invention consists of a lens set 10, a rotation base 20, an outer case 30, an elastic member 40, and a driving device 50. In usage, the lens module 1 is disposed on a printed circuit board and the lens set 10 is focused onto an image sensor such as CCD on the printed circuit board. By outer thread 11 on outer surface, the lens set 10 is threaded with the inner thread 21 and is fixed on the rotation base 20, integrated with each other. The rotation base 20 is a cylindrical sleeve and a radical linkage 22 with a camshaft 221 on rear end is arranged on outer surface thereof. Two slants 24 with proper length are disposed symmetrically on a stepping surface 23 on outer surface of the rotation base 20. Moreover, a plurality of (such as three) sloped grooved surface 25 with 40° central angle is mounted on circular bottom surface of the rotation base 20 while one end of the sloped grooved surface 25 is shallow grooved surface 251 inclining gradually to form deep grooved surface 252 on the other end. The gap between the shallow grooved surface 251 and the deep grooved surface 252 is focusing travel, distance for adjusting focus.

The outer case 30 is composed by an upper case 31 and a lower case 32 with corresponding locking members 34, 34a respectively. An insertion hole 33 mounted on the outer case 30 is for accommodating the lens set 10 that projects and extends outwards so as to form an optic pathway. The locking members 34, 34a can be a hook and a slot. The lower case 32 includes a rectangular base 321, a rectangular bracket 322, and a L-shaped area 326 on two sides of the rectangular bracket 322. An insertion hole 33 is mounted on center of the rectangular bracket 322 and the edge of the insertion hole 33 forms a circular flange 323 that having a plurality of supporting point 324 on outer circular surface, corresponding to the sloped surface 25. Moreover, an elastic member 40 is formed by strings and is arranged on top of the two symmetrical surface of the rectangular bracket 322 that corresponds with each other.

While being assembled, the rotation base 20 is mounted inside the outer case 30, located inside the rectangular bracket 322 so as to make the linkage 22 extends outward to top of the base 321 through an opening 325 on one side. The plurality of sloped grooved surface 25 presses elastically on corresponding supporting points 324 while the two parallel elastic members 40 presses downwards on corresponding slants 24 of the rotation base 20 by elasticity of the string so as to make each sloped grooved surface 25 of the rotation base 20 also presses downwards on corresponding supporting point 324 respectively. Thus the rotation base 20 is disposed inside the outer case 30 and is in rotatable status.

The driving device 50 composed by a stepping motor 51, a reduction gear 52 and a rack 53 is arranged on a L-shaped area 326 of the lower case 32. The stepping motor 51 is mounted on a corresponding slot 327 on one side of the L-shaped area 326 and a gear shaft 511 therein drives the reduction gear 52 to rotate. The rack 53 is arranged on a sliding slot 328 on the other side of the L-shaped area 326. Thus the reduction gear 52 drives the rack 53 to move linear inside the sliding slot 328. A guiding slot 531 is disposed on one end of the rack 53 so as to accommodate the camshaft 221 on rear end of the 徑向radial linkage 22 of the rotation base 20. Thus when the rack 53 moves linearly, the camshaft 221 is driven to move synchronously by the guiding slot 531. Then the rotation base 20 is further driven to rotate. The specification of an embodiment in accordance with the present invention is as following: the outer diameter of the stepping motor 51 is 4 mm, each step moves the rotor 11.25 degrees, and the output torque is about 0.65 gw-cm. The linear movement of the rack 53 makes the stepping motor 51 have 93 steps. Thus as to the focusing travel of lens of mobile phones-less than 0.5 mm, the precision of the driving device 50 is less than 0.005 mm/step.

Figure 1:
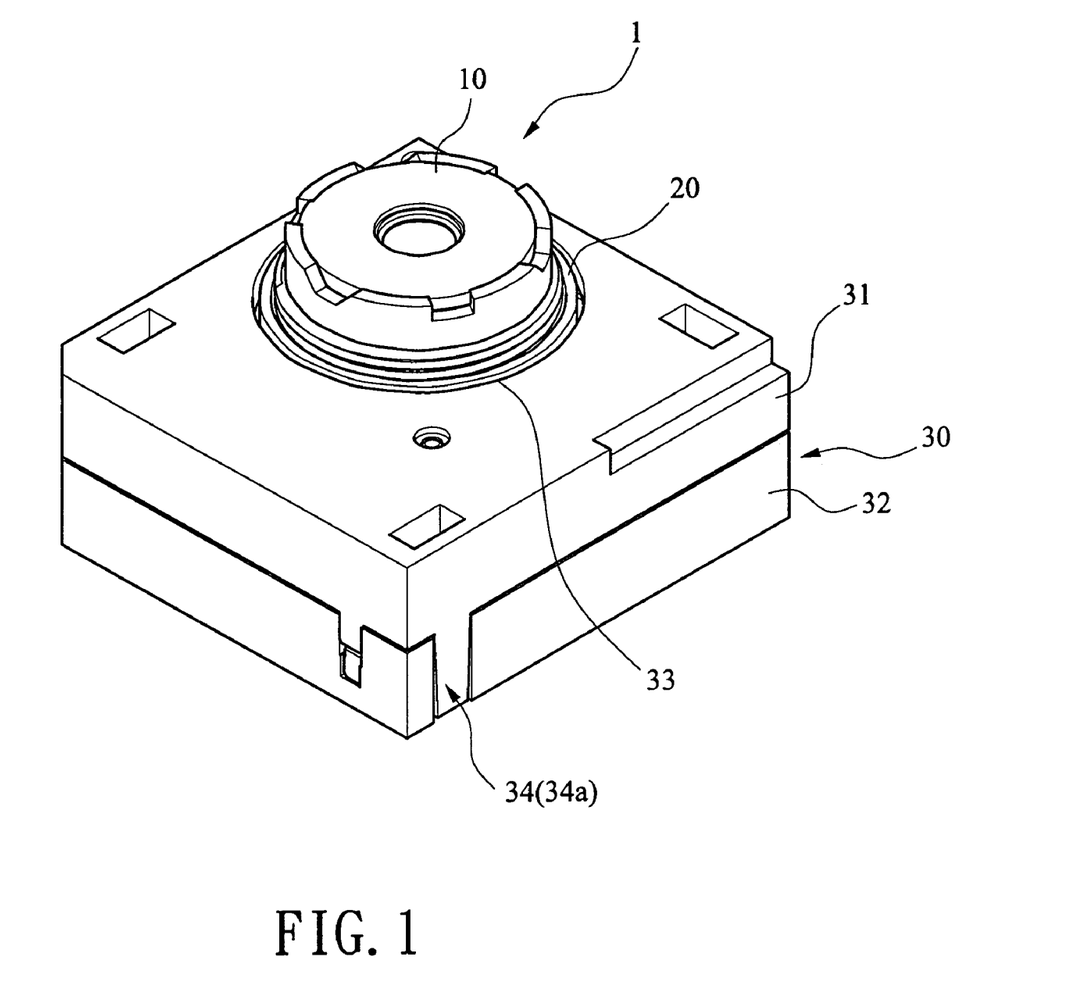
FIG. 1 is an assembling view of an embodiment in accordance with the present invention.
Figure 2:
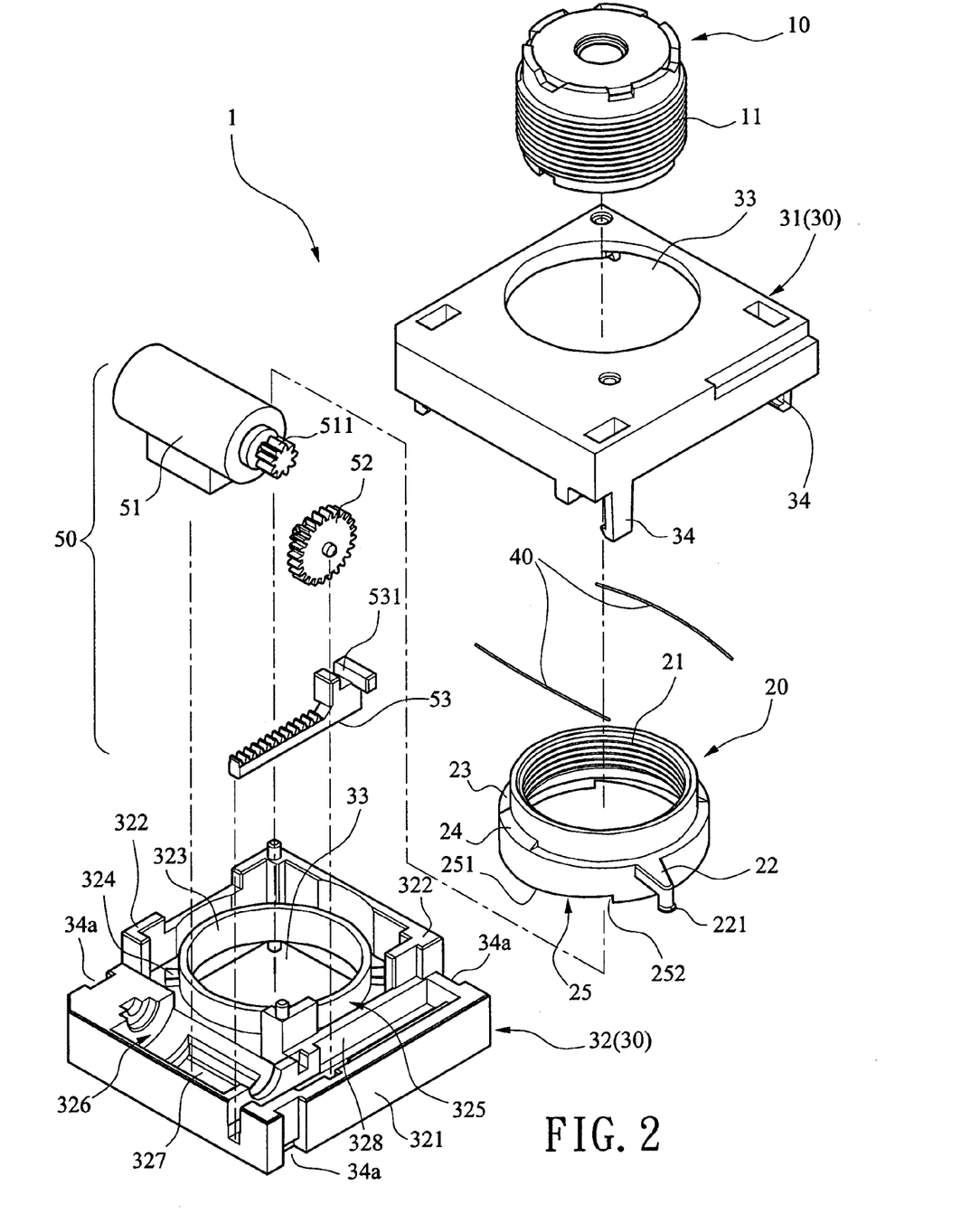
FIG. 2 is an explosive view of the embodiment in FIG. 1.
Figure 3A:
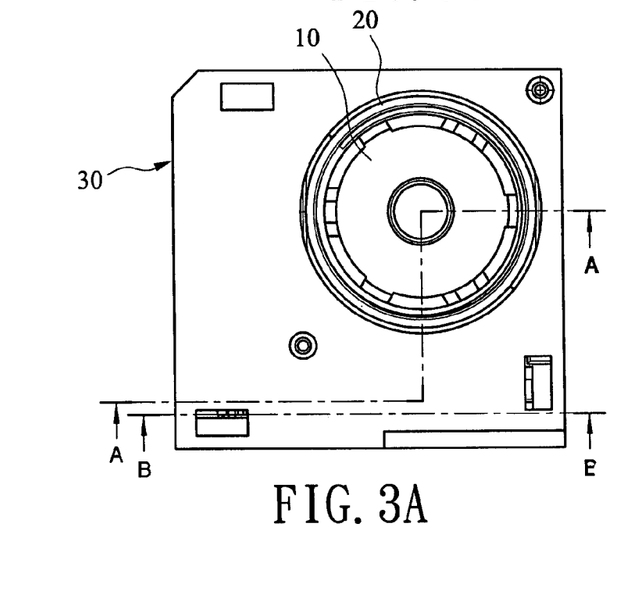
FIG. 3A, FIG. 3B, & FIG. 3C are top view and two side views of the embodiment in FIG. 1.
Figure 3B:
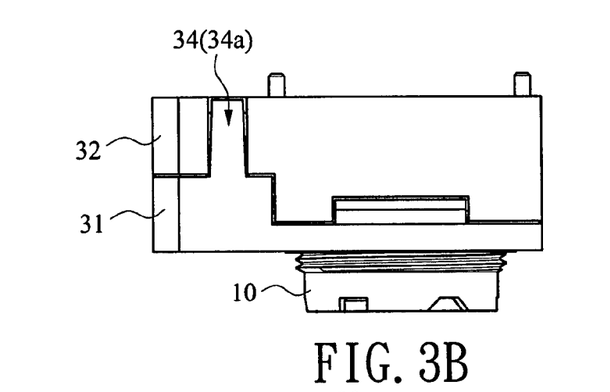
Figure 3C:
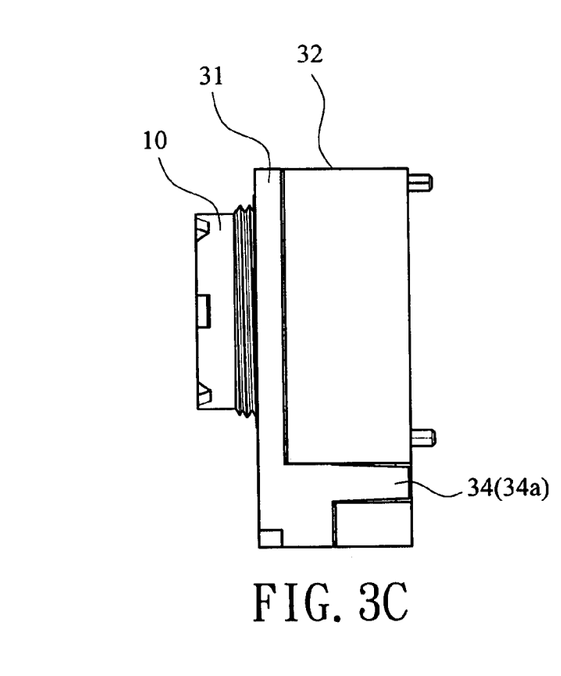
Figure 4:
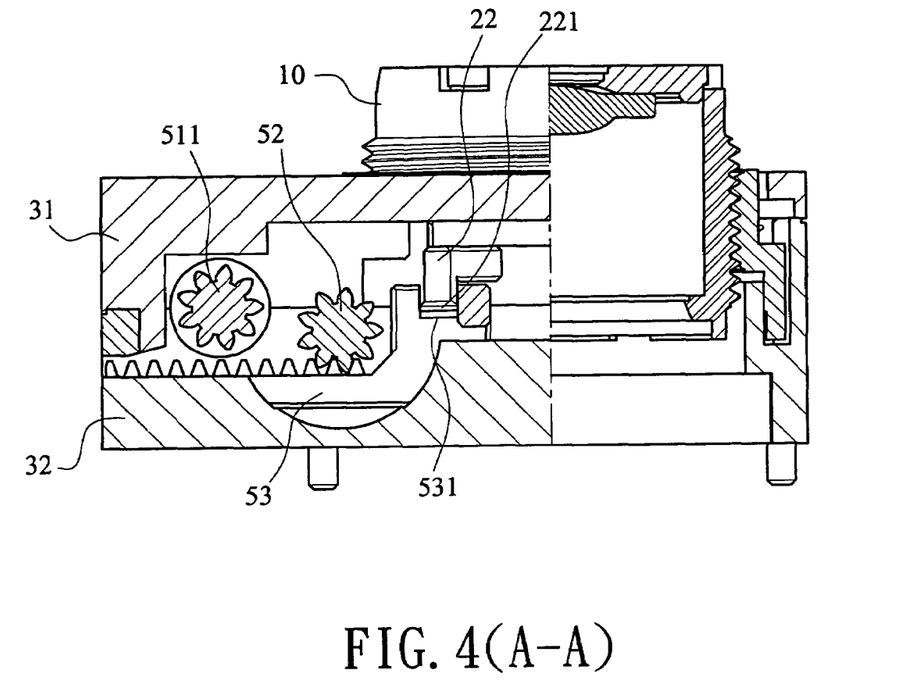
FIG. 4 is a cross sectional view along A-A line of the embodiment in FIG. 3A.
Figure 5:
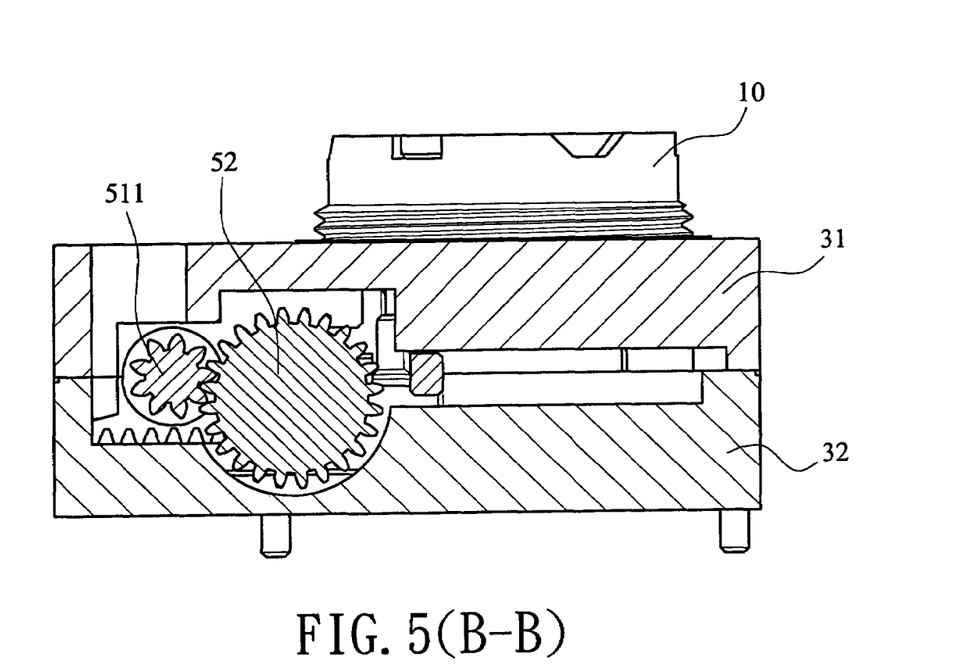
FIG. 5 is a cross sectional view along B-B line of the embodiment in FIG. 3A.
Figure 6:
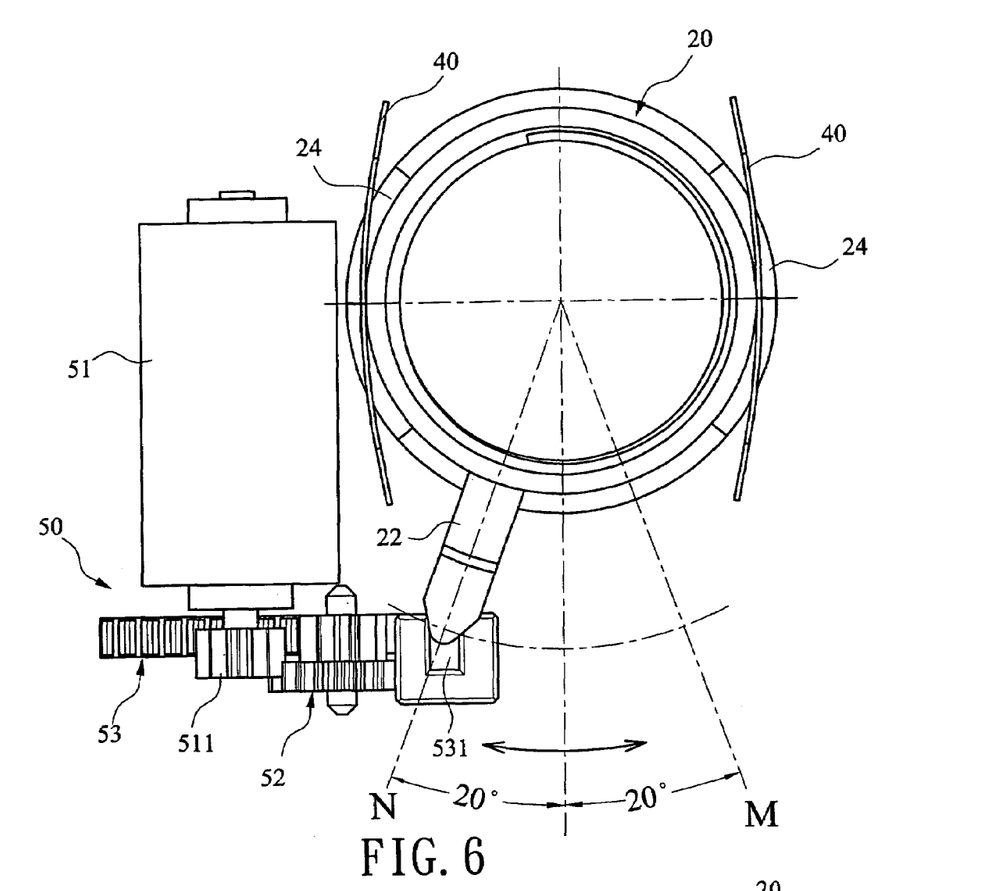
FIG. 6 is a top view of a driving device in accordance with the present invention.
Figure 7:
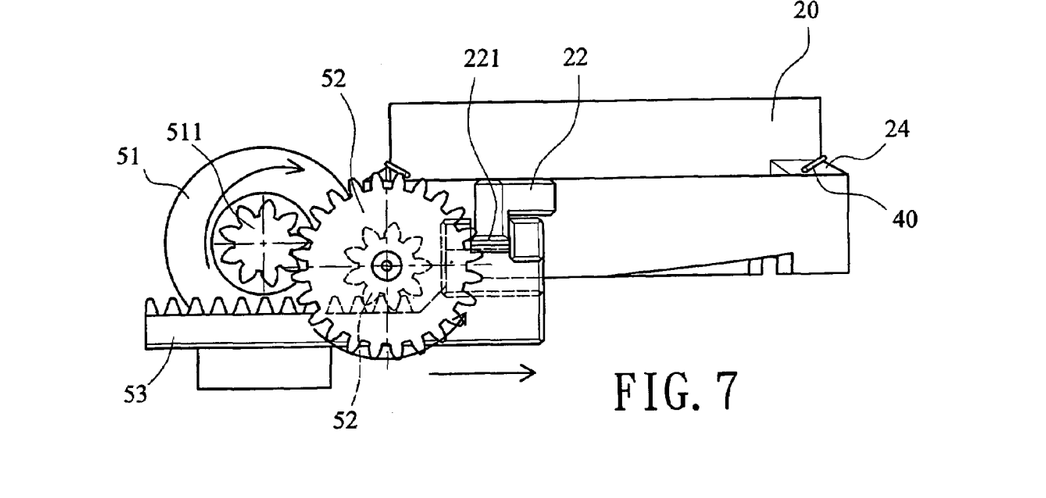
FIG. 7 is a schematic drawing of a side view of the embodiment in FIG. 6.
Figure 8:
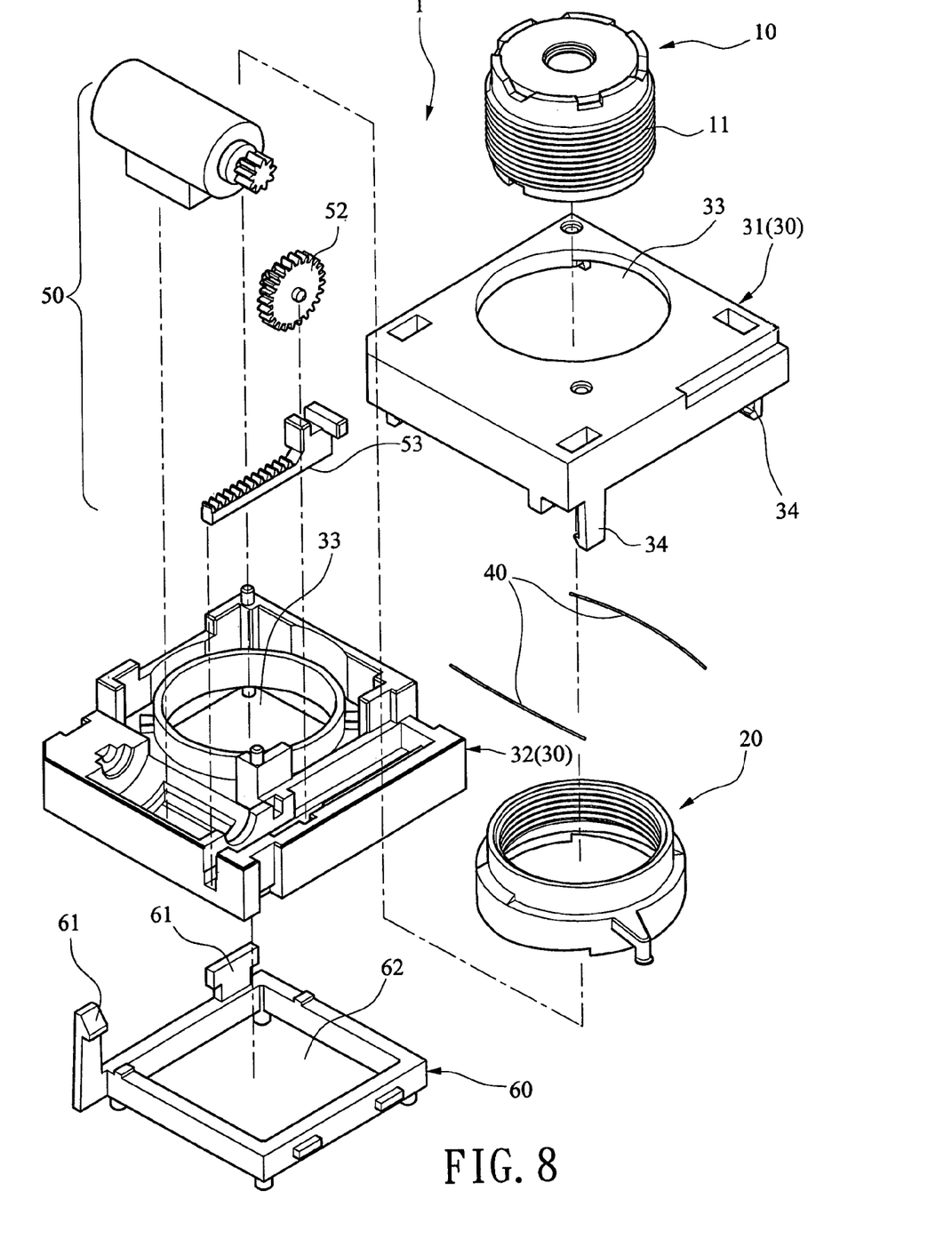
FIG. 8 is an explosive view of a hollow base frame arranged on bottom of a lower case in accordance with the present invention.
Figure 9A:
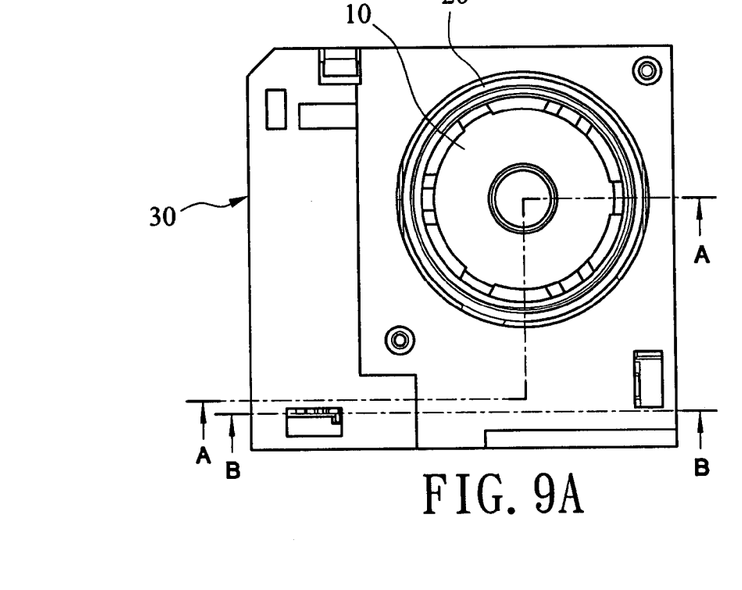
FIG. 9A, FIG. 9B, & FIG. 9C are schematic drawing of top view and two side views of the embodiment in FIG. 8.
Figure 9B:
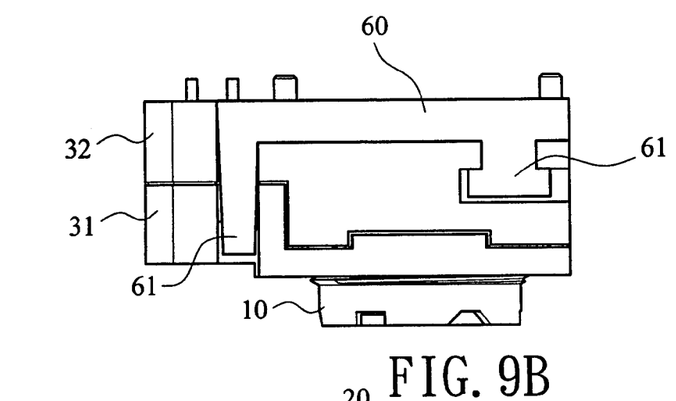
Figure 9C:
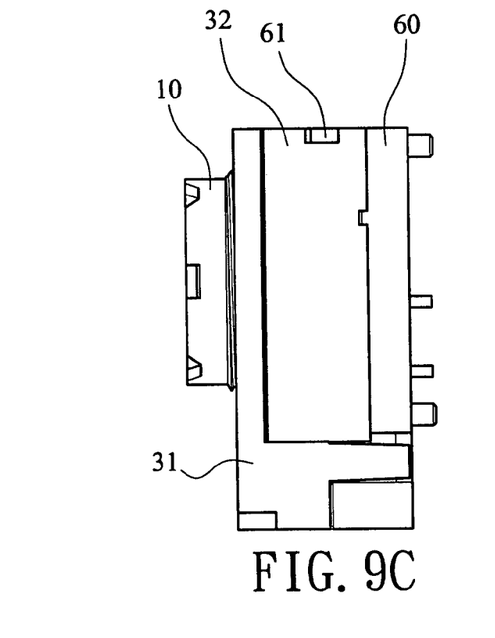
Figure 10A:
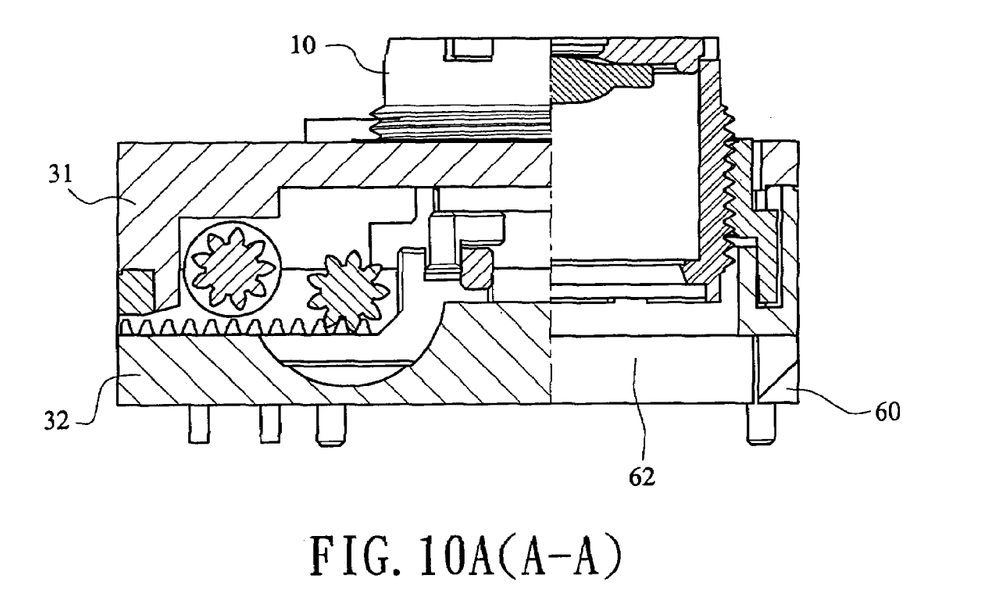
FIG. 10A is a schematic drawing of cross section along A-A line of the embodiment in FIG. 9A.
Figure 10B:
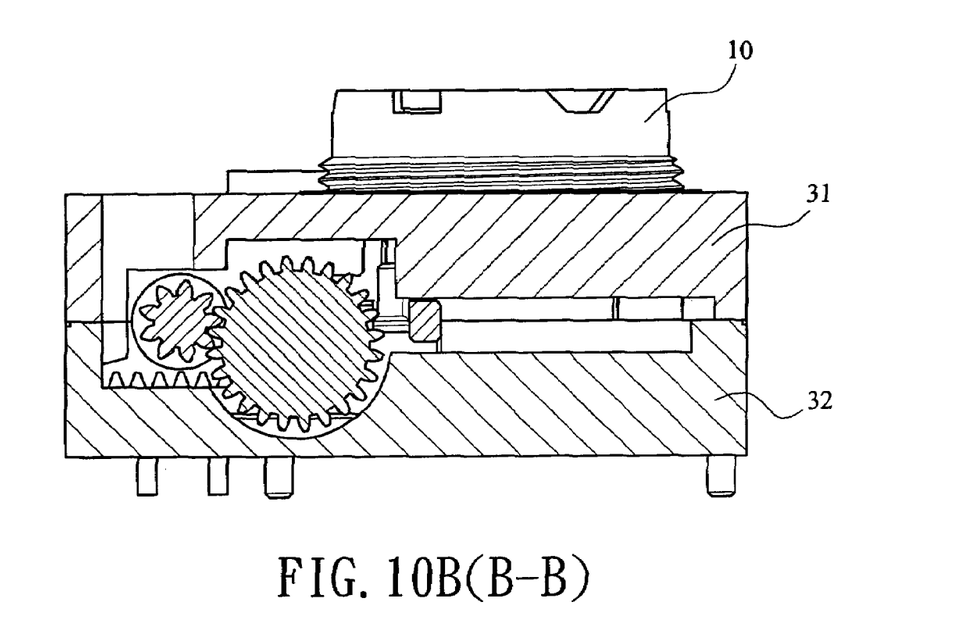
FIG. 10B is a schematic drawing of cross section along B-B line of the embodiment in FIG. 9A.

Refer to FIG. 6 & FIG. 7, the stepping motor 51 moves clockwise or counterclockwise so as to drive the rack 53 moving linearly. And the rotation base 20 rotates during the range from N-end to M-end (the central angle is about 40°), as shown in FIG. 6. Thus the sloped grooved surface 25 of the rotation base 20 moves relatively to the corresponding supporting points 324 of the lower case 32 and an upwards or downwards displacement is generated. The gap between the shallow grooved surface 251 and the deep grooved surface 252 is focusing travel so that the purpose for adjusting the focus of the lens is achieved.

Refer to FIG. 8, FIG. 9A-9C, FIG. 10A & FIG. 10B, part of the bottom of the lower case 32 according to the lens module 1 is modified. Compared with FIG. 4 & FIG. 5, embodiment in FIG. 10A & FIG. 10B having a base frame 60 under the rectangular bracket 322. The base frame 60 is a hollow frame with a plurality of fastening mechanism 61 that corresponds to fastening mechanism 61 on the lower case 32 of the lens module 1. The fastening mechanism 61 can be like the locking mechanism 34, 34a—a pair of hook and slot shown in FIG. 1, FIG. 2, & FIG. 8. Thus the base frame 60 is fastened under the rectangular bracket 322 of the lens module 1 easily by the fastening mechanism 61 and the hollow area 62 inside the base frame 60 as well as the insertion hole 33 of the outer case 30 is on the same axis.

When the lens module 1 is arranged on a printed circuit board, the base frame 60 is held on the corresponding image sensor such as CCD on the printed circuit board so as to make the image sensor such as CCD be located within center of the hollow area 62 of the base frame 60. Then by the fastening mechanism 61, the lens module 1 is fastened on the base frame 60. After the lens set 10 of the lens module 1 focusing with the image sensor such as CCD, the base frame 60 is glued and fixed on the printed circuit board so as to finish assembling. If there is any stain on the CCD and the lens module 1 is going to be disassembled, the lens module 1 is separated with the base frame 60 by the fastening mechanism 61. Thus the lens module 1 can be reused. Next the fixed base frame 60 is dismounted from the printed circuit board. Therefore, no matter there is any damage on the base frame 60 during the disassembling process, the damage of the lens module 1 is avoided.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A lens module comprising a lens set, a rotation base, an outer case, elastic members, a driving device and a base frame, wherein
   the lens set is fixed inside the rotation base;
   the rotation base is a cylindrical sleeve with the lens set fixed therein; a radial linkage with a camshaft on rear end is arranged on outer surface thereof, projecting outwards; slants for supporting are disposed symmetrically on outer surface of the rotation base while a plurality of sloped grooved surface with certain central angle is mounted on circular bottom surface of the rotation base; and one end of the sloped grooved surface is shallow grooved surface inclining gradually to form deep grooved surface on the other end thereof so that the gap between the shallow grooved surface and the deep grooved surface is as focusing travel;
   the outer case formed by an upper case and a lower case locking with each other while the lower case having a rectangular base, a rectangular bracket, and a L-shaped area on two sides of the rectangular bracket rack; an insertion hole is mounted on center of the rectangular bracket rack and the edge of the insertion hole forms a circular flange that having a plurality of supporting point on outer circular surface thereof, corresponding to the sloped grooved surface;
   the elastic members are arranged on top surface of the rectangular bracket and press downwards on slants for supporting of the rotation base so as to make each sloped grooved surface of the rotation base also presses downwards on corresponding supporting point of the circular flange respectively;
   the driving device having a stepping motor, a reduction gear and a rack is arranged on a L-shaped area of the lower case; the stepping motor drives the reduction gear to rotate while the reduction gear further drives the rack to move linearly; a sliding slot is disposed on one end of the rack for accommodating the camshaft on rear end of the linkage of the rotation base; and
   the base frame is a hollow frame with a plurality of fastening mechanism disposed between the lower case and the lens module so that the base frame is fastened under the rectangular bracket of the lens module by the fastening mechanism and a hollow area inside the base frame as well as the insertion hole of the outer case is on the same axis;
   in accordance with the above structure, when the stepping motor rotates clockwise/counter clockwise, the rack is driven to move linear and further driving the rotation base so that the sloped grooved surface having the shallow grooved surface as well as the deep grooved surface of the rotation base moves relative to the corresponding supporting point; thus the rotation base has upward/downward displacement according to the gap between the shallow grooved surface and the deep grooved surface for focus adjustment; When the lends module being assembled with a printed circuit board, firstly the base frame is adhered to the printed circuit board and then the lens module is fastened on the base frame by the fastening mechanism so that the lens module is integrated with or disassembled with the base frame.

2. The module as claimed in claim 1, wherein outer surface of the lens module having outer thread while the rotation base having inner thread so that the lens module is threaded and fixed on the rotation base, integrated with each other.

3. The module as claimed in claim 1, wherein the elastic member is formed by two strings.

4. The module as claimed in claim 1, wherein the fastening mechanism between the lower case and the base frame is a hook and a slot, corresponding to each other.

* * * * *